Aug. 7, 1956    S. A. SCHERBATSKOY    2,758,217
AUTOMATIC SCINTILLATION COUNTER
Filed May 17, 1951
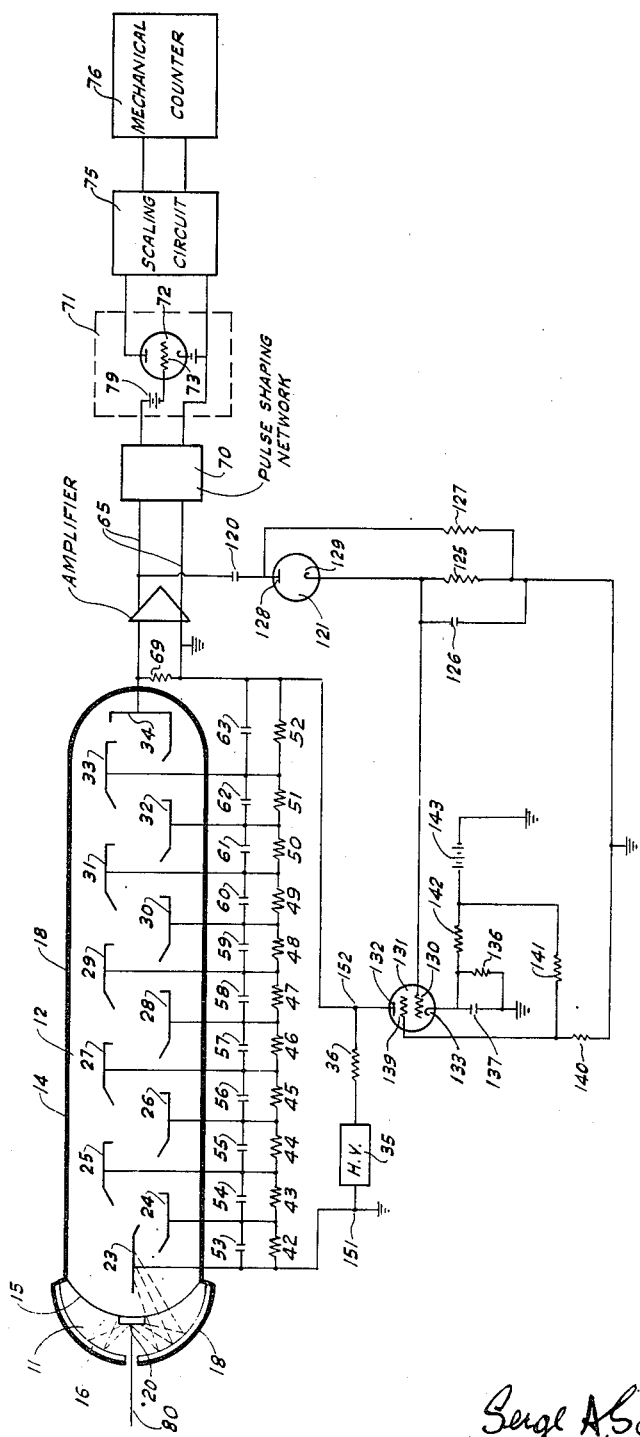
INVENTOR.
Serge A. Scherbatskoy

United States Patent Office 2,758,217
Patented Aug. 7, 1956

2,758,217
AUTOMATIC SCINTILLATION COUNTER

Serge A. Scherbatskoy, Tulsa, Okla., assignor to Perforating Guns Atlas Corporation, Houston, Tex., a corporation of Delaware Application May 17, 1951, Serial No. 226,875

5 Claims. (Cl. 250—71)

This invention relates to the detecting and measurement of radiation, and more particularly to a scintillation counter for measuring the intensity of such radiation as alpha, beta, gamma rays, or any other radiations resulting from nuclear transmutations or disintegrations.

As is well known, the detecting element of a scintillation counter consists of a suitably chosen crystal such as anthracene or cadmium tungstate commonly designated as "phosphor" that is adapted to scintillate, i. e. to convert the incoming radiation quanta such as photons into light impulses. In traversing the crystal the quantum to be detected loses its energy in exciting and ionizing the molecules of the crystal. These molecules then radiate energy in the form of fluorescent light, some of which is collected on the photocathode of the multiplier tube.

It is extremely difficult to assure that a crystal and a multiplier tube even very carefully made to any specification will be satisfactory and uniform in all its characteristics. The extreme sensitivity of the crystal and of the multiplier tube renders the apparatus liable to noises and spontaneous discharges, the origin of which is uncertain. Furthermore, the characteristics of the multiplier are also often found to change with time, temperature, and exposure to radiation, supply voltage, and other factors. The "dark current" from the cathode also contributes a variable and appreciable background noise.

It is the purpose of my invention to compensate for changes in a crystal and a multiplier tube arrangement and to provide an automatic controlling arrangement that will insure the stability of operation of the device.

It is another purpose of my invention to compensate for changes in the characteristics of the crystal or the multiplier tube and to provide a control arrangement for automatically adjusting the voltage supply of the multiplier tube in response to any departure from normal operating condition.

Other objects, together with some of the advantages to be derived in utilizing the present invention, will become apparent from the following detailed description taken together with the accompanying drawing showing a detecting instrument embodying the features of my invention.

Referring now more particularly to the drawing, the arrangement shown therein comprises a detector included within a housing 11 and photomultiplier 12, combined together as a single structure. The output of the photomultiplier is connected to the counter 76.

The photomultiplier is of a standard construction within a cylindrical enclosure 14 provided with a transparent wall 15. The wall 15 is of a thin optical glass or of a suitable plastic. The detector housing is placed adjacently to the photomultiplier and has its outer wall coated with a light gathering mirror 16. Both the detector and photomultiplier form a unitary structure having its outside walls coated with black paint 18. The detecting element contained within the housing 11 consists of a suitable crystal 20, said crystal being preferably naphthalene, anthracene, cadmium tungstate or calcium tungstate.

The photomultiplier is provided with a photosensitive cathode 23 and a plurality of dynodes 24–34, each at a higher potential than the potential of the preceding one. The anode potentials are derived from a voltage divided circuit consisting of a high voltage supply 35 in series with a resistor 36 and a plurality of resistor elements 42–52, said resistor elements being individually shunted by condensers 53–63, respectively. The voltage applied across the resistors 42–52 is approximately 1100 volts. Consequently, the voltage applied across each of said resistors is approximately 100 volts. The voltage across the resistor 42 is applied between the photocathode 23 and anode 24, the voltage across the resistor 43 is applied across the anodes 24, 25 and the voltages across the resistors 44, 45, 46, 47, 48, 49, 50, 51 are applied across the anodes 25—26, 26—27, 27—28, 28—29, 29—30, 30—31, 31—32, 32—33, respectively. The voltage derived from the resistor 52 is applied across the anodes 33—34 in series with the resistor 69. The output leads 65 connect the terminals of the resistor 69 to the pulse shaping network 70. For a description of a pulse shaping network see J. W. Coltman and Fitz-Hugh Marshall, Nucleonics 1, 1947, page 58.

The operation of the scintillation counter can be briefly explained as follows: Let numeral 80 designate the track of incoming particles such as gamma ray photons. The particle penetrates into the crystal 20 and interacts with one of its electrons. As is well known, a Compton electron is ejected as a result of such interaction, said electron losing its energy by exciting and ionizing the molecules in said crystal in the immediate neighborhood of the point of interaction. These molecules radiate energy in the form of light in all directions. These rays of light become reflected by the mirror 16, then transmitted through the transparent wall 15 to the photomultiplier 12 wherein they impinge upon the photocathode 23, thus forming a single pulse of photoelectrons. This pulse is then amplified by the familiar secondary emission system of the multiplier tube comprising the photocathode 23 and the dynodes 24—34, each at a higher potential than the preceding one. Each photoelectron is swept to the first dynode by a potential difference of about a hundred volts and ejects four or five secondary electrons. These in turn are swept to the second dynode and similarly multiplied by the secondary emission amplification. After nine such stages, an avalanche of a million electrons, more or less, appears at the output of the photomultiplier tubes as a result of each initial photoelectron. We obtain then a relatively strong output signal which is transmitted to the pulse shaping network 70.

In evaluating the performance of a photomultiplier one should take into account signal to noise ratio and decrease insofar as possible the amount of noise that originates in the photomultiplier. The noise includes the dark current and statistical fluctuation in gain. The dark current noise appears as pulses which tend to overlap the signal pulses in amplitude, determining in this way the low intensity limit of sensitivity of the detector. The electrode surfaces, having a low work function, tend also to release electrons whenever they acquire the higher thermal velocities associated with molecular agitation even at room temperatures. Thus a dark current of 10,000 to 100,000 thermal emission electrons per second is emitted from photocathode and each dynode. Only those emitted from the photocathode receive the full amplification and are of primary importance in contributing to noise. These parasitic pulses intermingle with any radiation signal and tend to obscure them.

It is evident that under these circumstances it is necessary that means for distinguishing signal pulses from dark current be inserted into the system. It should be mentioned in that connection that both useful pulses and dark current pulses vary greatly in amplitude due to the statistical nature of the processes involved. However, on the average the useful pulses are larger in magnitude than the parasitic pulses and therefore the discriminator should be arranged to be sensitive to pulses with heights surpassing a definite threshold value and it should be insensitive to pulses below said threshold value.

Such a discriminator network designated by block 71 is applied to the output terminals of the pulse shaping network 70. The discriminator network consists essentially of a thyratron tube 72 having its grid 73 at a fixed negative potential by means of the battery 79. The magnitude of this potential determines the threshold above which the impulses are transmitted through a scaling circuit 75 to the counter 76.

As stated above, the characteristics of the crystal and of the photomultiplier usually are not stable and due to conditions beyond our control and magnitude of the impulses derived from the output of the photomultiplier may undergo unpredictable changes. It would be then desirable to vary the operating voltage applied to the dynodes of the photomultiplier in order to follow these changes so as to maintain the value of the signal (or useful) output impulses invariant. To accomplish this I provide an arrangement in which these variations of the dynode operating voltage are affected automatically.

In accordance with my invention I utilize the decrease (or increase) of the size of the impulses derived from the output of the photomultiplier as a controlling factor in order to adjust automatically a suitable controlling device. This controlling device increases (or conversely decreases) the operating voltage applied to the dynodes of the photomultiplier in order to restore the impulses $E_k$ to their previous value.

Thus the controlling device adjusts the operating voltage in response to the output impulses in order to restore these impulses to their normal operating magnitude.

As shown in the drawing, one of the output terminals 65 of the photomultiplier is grounded while the other terminal is connected to an amplifier and then to a condenser 120 in series with a rectifier 121 and a resistor-condenser element consisting of a resistor 125 shunted by a condenser 126. Another resistor 127 is connected between the anode 128 of the rectifier 121 and the ground. The cathode 129 of the rectifier is connected to the grid 130 of a tube 131. The tube 131 has its plate 132 connected to the resistor 36. The cathode 133 of the tube 131 is connected to the ground by means of a resistance condenser element, said element consisting of a resistance 136 shunted by the condenser 137.

It is apparent that the tube 131 constitutes a shunt applied to the resistor 36 in series with the high voltage supply 35 and that the equivalent impedance of the shunt may be appropriately varied by means of the voltage applied to the grid 130.

The tube 131 is provided with a screen grid 139 which is connected to ground by means of resistor 140, the other terminal of said resistor being connected through resistors 141, 142 to the cathode 133. The tube 131 is energized by a battery 143 having its negative terminal grounded and the positive terminal connected to the junction of resistors 141 and 142.

It is apparent that normally in the absence of any radiation the grid 130 is maintained at zero potential and the cathode at a positive potential derived from the battery 143.

The operation of the above arrangement is as follows:

The photomultiplier is energized by the high voltage supply 35. This high voltage supply is chosen to have a substantially higher voltage than will be required for the operation of the photomultiplier. Under normal operating conditions, even in the absence of my external radiation, there is a small current flowing from the battery 35 through a circuit consisting of the resistor 36 in series with the variable resistance tube 131 and the resistance capacitance element 136—137. This current causes a voltage drop across the resistor 36. The actual operating voltage applied to the photomultiplier consists of the difference of potential between the terminals 151 and 152 and is equal to the voltage of the battery 35 decreased by the potential drop across the resistor 36.

It is apparent that by varying the potential applied to the grid 130 of the tube 131 the equivalent resistance of the tube varies. This in turn causes variation in the current through the resistor 36 and consequently the variation of the operating voltage $E_o$ derived from the terminals 151, 152. Consequently, by varying the grid voltage of the tube 131 we effect a corresponding variation in the operating voltage of the photomultiplier.

Under normal operating conditions we obtain succession of discharges through the resistor 69 due to the passage of radiation particles. The voltage impulses caused by these discharges are rectified by means of the rectifier 121. We obtain thus a unidirectional current flowing through the resistor 125 and a voltage proportional to this current appears across the terminals of the condenser 126. This voltage is substantially equal to the peak value of the biggest pulses appearing across wires 65. This voltage is applied to the grid of the tube 131 and thus maintains the operating voltage of the photomultiplier tube at its normal value.

Assume now that due to some extraneous conditions beyond our control, the voltage impulses across the terminals 65 increased (or conversely decreased) in magnitude. Consequently, the rectified current passing through the resistor 125 increases (or conversely decreases) in intensity and causes corresponding increase (or decrease) of the voltage at the condenser 126. This increase in voltage applied to the grid 130 of the tube 131 causes a corresponding decrease (or conversely increase) in the equivalent resistance of the tube. Consequently, the corresponding current delivered by the battery 35 and passing through the resistor 36 increases (or conversely decreases) in magnitude. This in turn increases (or conversely decreases) the voltage drop across the resistor 36. Therefore, we obtain at the terminals 151, 152 a new value of the operating voltage $E'_o$ that has changed in magnitude so as to countereffect the drift and the voltage impulses $E_k$ are automatically maintained at a constant value.

It is thus apparent that if the voltage impulses developed by the photomultiplier are too large (or conversely too small) the circuit automatically readjusts itself and decreases (or conversely increases) the voltage supplied until it has a lower (or conversely higher) value and countereffects the increase (or conversely decrease) of the voltage impulses supplied by the scintillating phosphor or by the photomultiplier.

It is thus apparent that I have provided a photomultiplier for a scintillation counter with a controllable voltage supply for applying a controllable voltage between the electrodes 23 and 34 of the photomultiplier. The controllable voltage supply consists of the high voltage supply 35, in series with the resistor 36 and the variable shunt element comprising the tube 131. Under normal operating conditions the counter produces impulses of a determined magnitude $E_k$. It may happen, however, that because of some effects beyond our control the impulses $E_k$ have changed their magnitude and assumed a new value $E'_k$. It is then desirable to have an automatic circuit that will restore the apparatus to normal operating conditions and will restore the impulses to their normal value $E_k$. I accordingly provide such an automatic circuit that is arranged to be responsive to any departure of the impulses from the normal value $E_k$, and is effective to modify the variable shunt element and thus to effect an appropriate control upon the voltage supplied to the photomultiplier. As a result of such a control the voltage between the dynodes of the photomultiplier has been changed in such a manner as to restore the magnitude of the impulses to their normal operating value $E_k$.

While I have described my invention in connection with certain specific embodiments thereof, it is to be understood that this is by way of illustration and not by way of limitation and I do not mean to be bound thereby, but only to the scope of the appended claims which should be construed as broadly as the prior art will permit.

I claim:

1. A scintillation counter for measuring incoming radiation, comprising a substance adapted to interact with said radiation and to produce light as a result of said interaction, a photoelectric system for translating said light into useful electrical impulses of relatively large magnitude, said useful impulses being accompanied by parasitic impulses of smaller magnitude originating within said system, the magnitudes of said useful and parasitic impulses being subject to uncontrollable drifts, a controllable supply of voltage for energizing said system and for controlling the magnitudes of said impulses, a threshold element connected to the output of said system for selecting only those impulses above a predetermined threshold value, said threshold value having definite relation to the magnitudes of said impulses, an arrangement for maintaining said relation in the presence of said drifts, said arrangement comprising means responsive to any departure of said impulses selected from their normal amplitudes and substantially independent of the rate of formation of said selected pulses for controlling said supply of voltage in order to reduce said departure.

2. A scintillation detector for measuring the quanta per second of incoming radiation, comprising a substance adapted to interact with individual quanta of said radiation and to produce light impulses as a result of said interactions, a photo-multiplier for translating said light impulses into corresponding electrical impulses, a unidirectional potential source for energizing said photo-multiplier, means for developing a control signal proportional to the peak amplitude of said electrical impulses and substantially independent of the rate of pulse formation of said impulses, and means controlled by said control signal for varying the output of said potential source inversely with changes in said peak amplitude, thereby to maintain the amplitude of said electrical impulses within a predetermined range of values.

3. A scintillation detector for measuring the quanta per second of incoming radiation, comprising a substance adapted to interact with individual quanta of said radiation and to produce light impulses as a result of said interactions, a photo-multiplier for translating said light impulses into corresponding electrical impulses, a unidirectional potential source for energizing said photo-multiplier, means for developing a unidirectional control potential having a magnitude proportional to the peak amplitude of said electrical impulses, and means controlled by said control potential for varying the output of said potential source inversely with changes in said peak amplitude when said control potential exceeds a predetermined minimum level, thereby to maintain the amplitude of said electrical impulses within a predetermined range of values.

4. A scintillation detector for measuring the quanta per second of incoming radiation, comprising a substance adapted to interact with individual quanta of said radiation and to produce light impulses as a result of said interactions, a photo-multiplier for translating said light impulses into corresponding electrical impulses, said photo-multiplier having a plurality of dynodes and an output electrode, a voltage divider network interconnecting said dynodes, a high potential source, means including a resistor connected between said high potential source and said voltage divider network for energizing said dynodes, a control tube having the anode thereof connected to said resistor, means for peak rectifying electrical impulses derived from said output electrode to obtain a unidirectional control voltage, and means for impressing said unidirectional control voltage on the control electrode of said control tube, thereby to maintain the amplitude of said electrical impulses within a predetermined range of values.

5. A scintillation counter for measuring the quanta per second of incoming radiation, comprising a substance adapted to interact with individual quanta of said radiation and to produce light impulses as a result of said interactions, a photo-multiplier for translating said light impulses into corresponding electrical impulses, counting means for determining the number of said electrical impulses produced per second, a unidirectional potential source for energizing said photo-multiplier, means for developing a control signal proportional to the average peak amplitude of said electrical impulses, said last named means being substantially unaffected by changes in the rate of occurrence of said electrical impulses, and means controlled by said control signal for varying the output of said potential source inversely with changes in said peak amplitude, thereby to maintain the amplitude of said electrical impulses within a predetermined range of values.

References Cited in the file of this patent

UNITED STATES PATENTS

| | | |
|---|---|---|
| 2,130,152 | Perkins | Sept. 13, 1938 |
| 2,280,303 | Reynolds | Apr. 21, 1942 |
| 2,443,857 | Herzog | June 22, 1948 |
| 2,457,747 | Sweet | Dec. 28, 1948 |
| 2,512,355 | Marshall et al. | June 20, 1950 |
| 2,534,668 | Gunderson | Dec. 19, 1950 |
| 2,539,203 | Pohl | Jan. 23, 1951 |
| 2,550,106 | Coltman et al. | Apr. 24, 1951 |
| 2,583,132 | Altar et al. | Jan. 22, 1952 |
| 2,583,143 | Glick | Jan. 22, 1952 |